United States Patent
Bowen

[15] 3,658,375
[45] Apr. 25, 1972

[54] PICKUP TRUCK CAMPING BODY
[72] Inventor: Duane C. Bowen, Construction Trades Center 2541 State Street, Carlsbad, Calif. 92008
[22] Filed: July 13, 1970
[21] Appl. No.: 54,303

[52] U.S. Cl. ..........................................296/23 MC, 296/27
[51] Int. Cl. ..............................................................B60p 3/34
[58] Field of Search ................................296/23, 23 MC, 27

[56] References Cited
UNITED STATES PATENTS 3,145,046   8/1964   Orn..................................296/23 MC
3,558,181   1/1971   Peterson..................................296/27

Primary Examiner—P. Goodman

[57] ABSTRACT

A pickup truck camping body has a roof that raises and beds that pull or fold out for camping in the manner of standard folding camping trailers 4 Claims, 2 Drawing Figures

PATENTED APR 25 1972

3,658,375

INVENTOR.

BY Duane C. Bowen

PICKUP TRUCK CAMPING BODY

BRIEF SUMMARY OF THE INVENTION

My invention concerns improvements in pickup trucks camping bodies, and, more particularly, to providing more sleeping room in a standard camper shell height body by use of a roof that raises and beds that pull or fold out for camping in constructions standard to folding camping trailers.

Camping shelter facilities range from tents at the lower end of the price range to camping buses, elaborate rigid trailers, and large cab-over camping bodies for pickups at the upper end of the price range. Over the years, the categories of camping shelters have become somewhat standardized, are mass-produced, and have considerable sophistication and refinement, particularly as compared to earlier years when many of these forms of shelter were relatively crude, individually built units, oftentimes fabricated by the owner out of plywood. Some of the principal standardized types of camping shelters at this time include various categories of tents, camping bodies on pickup trucks, rigid trailers, folding trailers, vehicles the size of so-called "panel" trucks or smaller (some with "pop-up" tops), and large bus-size camping vehicles. In many instances there are choices among various types of units in roughly the same price bracket, i.e. (a) a pickup truck and camper shell or cover may be comparable in price to panel-truck sized vehicles outfitted for camping, or (b) an elaborate folding trailer, a small rigid trailer, and a low priced camping body for a pick-up truck (if the cost of the truck is not included) may be comparable in price. The purchaser will take various factors into consideration in selecting a camping vehicle including (a) how the camping vehicle (i.e., camping bus) or multi-purpose vehicle (i.e., pickup) fits into the family non-camping needs for transportation, (b) the price he can afford, (c) the size of his family requiring certain numbers of beds, (d) a common desire for more space, because space is usually at a premium for sleeping or non-sleeping purposes such as cooking, eating, relaxing, etc., (e) weight, wind resistance on the road, handling characteristics, etc., (f) auxiliary equipment such as ice boxes, stoves, ranges, air conditioning, lights, water, toilets, etc., and (g) how much use the camping shelter will have and under what conditions.

My invention concerns camping shelters of roughly the price range of folding camping trailers and small rigid camping trailers (if the pickup truck involved in my invention is not considered a cost factor). Although this cost bracket is not as low as tents, it is decidedly on the lower side of the total price range of camping facilities. From the foregoing, it will be understood that space is at a premium in this type of shelter, and particularly if a sizable family or group (i.e., four to eight people) is involved, and most particularly for sleeping space (and the problem of room for dressing, access, etc., if the available floor area is substantially covered with beds). What I have done, essentially, is to combine advantages of pickup truck camper shells or covers and folding camping trailers, and that is an objective of my invention.

The pickup truck camper shell or cover could be considered as an excellent camping medium because at a very low price (if the pickup truck is not considered) a rigid housing is provided off the ground. This low price is because the construction merely involves a low body with metal roof, front wall, side walls, and rear wall with door (plus windows in the walls). The disadvantages include, however, (a) the very limited area for sleeping, and (b) the height too low for standing by grown people (which is not so great a consideration in traveling but is very inconvenient in camping). An objective of my invention is to devise a pickup camping body which provides extra sleeping room and head room for camping while maintaining some of the advantages of a camper shell or cover including the low profile in traveling to minimize wind resistance and including the low price of a pickup camper cover, meaning that while my construction is more expensive than the camper cover alone, it is substantially less expensive than the cab-over pickup camper. It is believed that I am the first to discover or perceive that a camping medium appealing to purchasers in a certain price range, and better serving the needs of many purchasers than other camping facilities, can be provided by combining the well developed structures of camper covers and folding camping trailers. These are units well developed over the years, and mass produced, to minimize the development period of a new construction and to minimize the price of new tooling, etc., and such combination of mass-produced structures is a further objective of my invention.

My invention will be best understood, together with additional objectives and advantages thereof, from the following description, read with reference to the drawings, in which.

Figure 1:
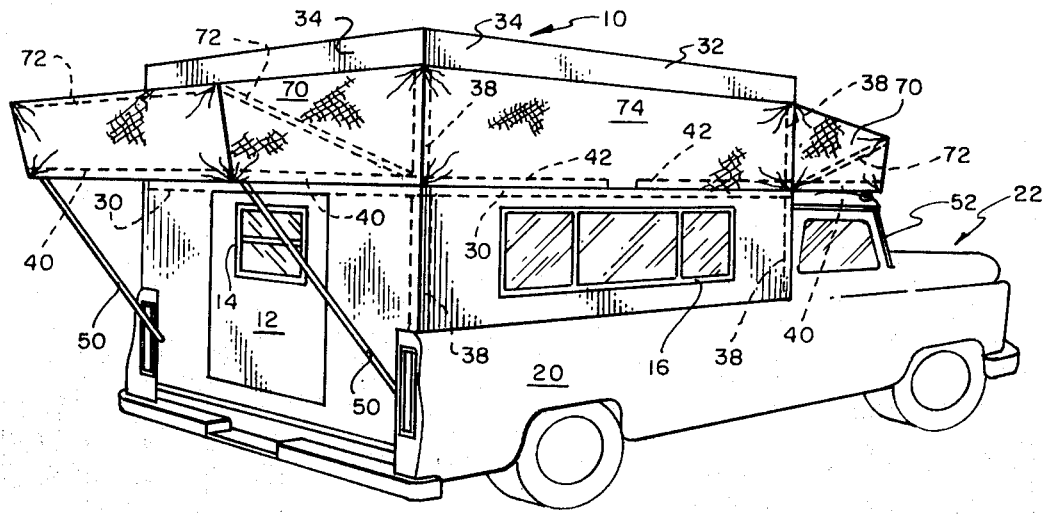
FIG. 1 is a perspective view of a camper, on a pickup, forming a specific embodiment of my new invention.

In the following description of camper 10 I will minimize details on constructions common to camper covers and to folding camping trailers. I will use the expressions "shells" and "covers" interchangeably as the same campers appear to be known by either name, the usage appearing to differ partly geographically. To identify camper covers in more detail, for purposes of specification and claims, and particularly the expression "standard camper shell height", I mean a pickup camping body, common to the market, of insufficient height to provide a bed over the pickup cab in the manner of cab-over pickup campers. In the most economical version of a camper cover, no floor is provided, as the floor of the pickup bed is used as the camping floor. Whereas I do not mean to exclude a floor made integral with the camper shell vertical walls, and superimposed to the floor of the pickup bed, in the manner common to cab-over campers, as to claim coverage, I do point out the use of the pickup bed floor for the camper floor is an economy applicable to my invention and consistent with one of the objectives of the invention of providing a camping facility in a low price bracket. It should be noted that my camper will be considerably lower priced than folding camping trailers as my camper does not require the floor, axle, wheels and tongue structures of folding camping trailers. When I use the expression "standard folding camping trailer parts", this will be readily understood by those working in the art as describing the applicable common details of these mass-produced collapsible camping trailers with pull-out or fold-out cantilevered beds.

Most camping covers have a rear door and windows in the front wall, door and side walls, which permit rear view mirror viewing of traffic behind through the cab rear window, camper front window and door window, and permit occupants in the camper cover during transportation to view the surroundings. If more than three persons are traveling, some need to ride in the camper, and the drawings show a rear door 12, a rear door window 14, and side windows 16. I do not show means for securing camper 10 down to the bed 20 of pickup 22, as these are common to pickup campers.

The "pickup camper cover" or "pickup camper shell" is distinguished from the expression "cab-over campers", the latter also being commonly known simply as "pickup campers", of so-called "chassis mount" and "slide in" varieties. The expression "standard cab-over camper height" means the mass produced articles of manufacture of sufficient height so that one bed is permanently located over the pickup cab. Many manufacturers make camper shells or covers. A few examples are: (a) "Gypsy Tops", Rush Springs Mfg. Co., Box 235, Rush Springs, Oklahoma, (b) "Vacationeer" Shells, Sun Valley, Calif., (c) "Topper" covers, B&B Industries, Topeka, Kansas, (d) "Weekender" covers, Campfire Campers, Inc., Chanute, Kansas, and (e) "Astro-Cap" shells, Cabana Mnaufacturing Company, Inc., Elkhart, Indiana. The details of construction of the vertical walls, door, and means to secure to bed 20 not especially illustrated or described can be taken as following common constructions such as those cited above.

As indicated above, I will also use the expression "folding camping trailers" in connection with upper parts including the roof, the means to elevate the roof, pull-out or fold-out beds, curtains, etc. To the extent that parts are not detailed in the description or drawings, this means that constructions common to the art of folding camping trailers can be used, of which the following folding camping trailer sources are representative: (a) "Oasis" collapsible camping trailers, Camel Manufacturing Co., Knoxville, Tenn., (b) "Starcraft" folding camping trailers, Starcraft Company, Goshen, Ind., (c) "Palamino" folding trailers, Vanguard Industries, Inc., Savage, Minn., (d) "Puma" camping trailers, Ski-Tow Manufacturing Company, Elkhart, Indiana, (e) "Wheel Camper" folding trailers, Wheel Camper Corp., Centreville, Michigan, and (f) "Nimrod" camping trailers, Ward Mfg., Hamilton, Ohio. Folding camping trailers formerly were made primarily with canvas tent tops supported by tubular folding frames but more commonly they are now made with rigid flat roofs (as illustrated by the roof construction herein) which are directly vertically elevated and are usually formed by a laminate of an inch or so of thickness made from plywood and/or metal plus a plastic foam, such as Styrofoam, with depending flange edges which can be of similar construction. It is the flat, rigid roof, and not the canvas pitched roof, of folding camping trailers that is used in my invention.

As implicit above, I delete the roof fixedly secured to the side walls of the ordinary pickup camper shell or cover, and substitute roof structure from the art of folding camping trailers. This will mean that the vertical walls of the camper need some extra reinforcement at their inner upper edges to maintain structural rigidity, and horizontal structural reinforcement is indicated in dotted lines at 30 in FIGS. 1 and 2, which can include some corner triangular bracing.

Roof 32, as previously indicated, follows flat hard top constructions of collapsible camping trailers, of laminated construction including a plastic foam insulation ply, including depending flanges 34 at the roof edges for structural rigidity. Preferably camping trailer constructions will be followed in which flanges 34 have lips lapping the upper edges of the upright walls as a rain and dust seal, and a resilient sealing strip can also be used between abutting surfaces. Such details are not illustrated as they are conventional in folding camping trailers.

Figure 2:
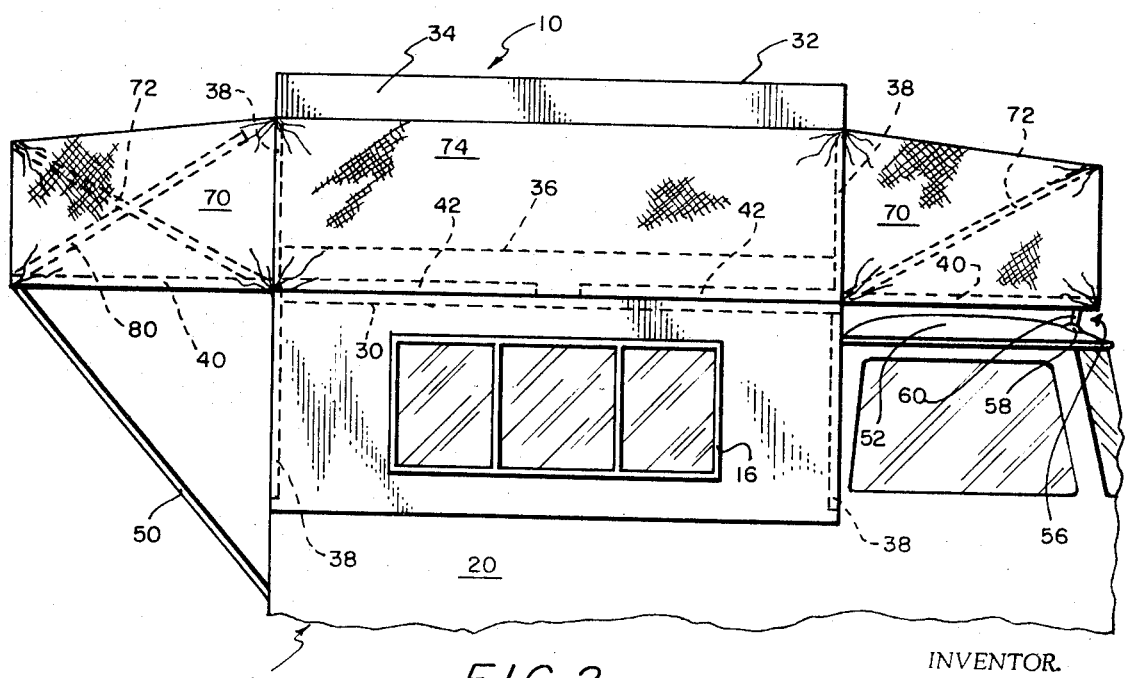
FIG. 2 is a fragmentary, enlarged side view.

Dotted lines at 36 in FIG. 2 illustrate the position of the top of roof 32 in collapsed, transportation position. Means 38 at each corner of camper 10 are used to elevate roof 32 from lower transportation position to upper camping position. Elevating means 38 are common to hard top collapsible camping trailers and some prior version of elevating means already in use will be adaptable to the present camper. For examples, the "Puma" trailer, "A" Series Model, referred to above, describes elevating a roof, "With only a dozen turns rear crank raises or lowers camper roof on concealed telescoping supports." The Starcraft trailer, referred to above, describes a winch and cable lifter system under U.S. Pat. No. 3,314,715. The Wheel Camper trailer elevates pneumatically with air cylinders on Executive models, and uses spring loaded articulated (rather than telescoping) arms at the corners of lower priced models. The referred to Palomino trailer, Colt series, also has pivoted folding arms, which is a more economical expedient than telescoping members (usually having internal pulleys and cables and connected to a single crank), and such articulated arms would be equally applicable here as roof elevating means. One illustration of camper shell heights is about 36 inches above the upper edge of the pickup bed sides or about 57 inches above the pickup bed floor. How high roof 32 is elevated is a design choice involving head clearance, bunk height, and economy. I recommend 2-4 foot elevation, which should provide a minimum of 6 ½ foot head clearance, and I prefer at least 3 foot elevation for convenient interior bunk height.

When the expression "bed height" is used, I mean sufficient vertical dimension to accomodate the supporting bed deck or panel, any mattress, and vertical room for a person to get into bed and lie down. This should be an understandable requirement without specific numerical dimensions, limitations, i.e., a manufacturer will not make the dimension so short as to be uncomfortable but there would be no reason for the manufacturer to go over about 4 feet merely to accomodate comfortable access to the bed. When I specify the roof in lower transportation position is "at a level less than a level a bed height above said cab", this should be readily understood by those working in the art as being a level not high enough to accomodate permanent "cab-over" bed structure, so that the roof in lower position defines a body of a height common to camper shells and covers and not of the height of a cab-over camper. This seems to be a common sense definition and not to require numerical limitations to be thoroughly understood. Likewise numerical values would appear unnecessary to understand the structure when I say the roof in "upper camping position being at a level at least equal to a level a bed height above said cab". In other words, the height is then sufficient to accomodate a pull-out bed above the cab. When I say the roof is raised above the upper edges of the vertical walls of the camper "a bed height", numerical values are not needed to instruct workers in the art to provide elevation for a bed, in the manner common to folding trailers. If the bed deck or supporting panel unfolds on hinges, then the roof has to be raised high enough, at least during bed unfolding, to permit unfolding.

Folding camping trailers provide cantilevered beds each adapted to accomodate two people, i.e., a 48 inch width and a 78 inch length are common. I illustrate the beds (shown at 40 in outer camping positions and shown at 42 in inner transportation positions) as being extended to front and rear. This involves a design choice. If the beds were instead extended to the sides of the camper, then the rear end would be cleared for a full size door, which would be a valuable convenience (in which case door 12 would have to be extended to the top margin of the upright rear wall and could be joined at its top by a canvas slide fastener closed opening). The disadvantages include structural weakness of the rear wall (reinforcement 30 would have to be broken at the rear wall) and the camper would have to be extended to an 8 foot width to accommodate two 4 foot beds or the beds would have to be reduced in width. I prefer front and rear extending beds, because of avoidance of the above problems, although the height of door 12 is inconvenient.

There are two basic methods of extending beds in cantilevered positions in camping trailers. One method, found more often in lower priced lines, is folding out of bed support panels or decks (usually metal panels, or perhaps plywood, pivoted on piano hinges) and the other method found more in higher price lines is pullout of bed support panels or decks (involving special guide members on beds and camper walls). Note that a 4 foot width bed deck requires 4 foot roof elevation for clearance in folding out. Either method of moving the beds between positions 40 and 42 is applicable to my camper, and I will not illustrate the details of the bed deck and of the pivoting hinge or guide rail pull out members as they are conventional and will be well understood by those working in the art.

Removable tubular bed supports, such as those shown at 50 in FIGS. 1 and 2, are conventional in the art of folding camping trailers and will not be detailed. When one of the bunks extends over pickup cab 52, the cab might as well provide support, rather than to use members 50, and I illustrate foot or leg support means 56 between the outer portion of bed 40 and cab 52 including suction cup means 58 and leg means 60 attachable to bed 40. Leg means 60 should be adjustable in length because the height of camper 10 relative to the height of cab 52 will vary from make to make of pickup.

Canvas or other flexible curtain means depend from roof 32 forming wall enclosures between the camper vertical walls and roof 32, including sloping cover sections 70 over the outer positions 40 of the beds. Cover sections 70 follow conventional camping folding trailer constructions and include pivotally mounted tubular U-shaped frames 72 (attached or attachable to covers 70) holding up the outer cover corners. Cover sections 70 may be already attached to bed, roof and frames, particularly with pull-out beds, in transportation positions 42 of the beds, so as to be positioned in camping positions merely by pulling out the beds; or cover sections 70 may be at least partly detached in the transportation positions 42 of the beds, so as to require some fastening as by grommets and turn buttons, to assemble in the camping positions 40 of the beds. Further details will not be illustrated or described as those working in the art of folding camping trailers will thoroughly understand the above description.

At the left side in FIG. 2, in dotted lines 80, the bed over door 12 is illustrated with its inner side latched (as by hooks and eyes, etc.) in an upper position when not in use to facilitate entry into door 12, in which case the structure 30 must be broken so that door 12 opens up the upper edge of the rear wall. The bed deck connection to the camper walls of course will have to accomodate detachment in order to be latched up, and this can be accomplished in a number of ways depending on whether hinged or pull-out bed decks are involved.

Pickup camping shells are usually sold without accessories. Folding camping trailers are sometimes sold without accessories and are sometimes sold with a number of accessories, some built in, such as mattresses, ice box, sink, storage boxes serving as seats, demountable tables, etc. My pickup camper can be sold stripped down or with accessories. For example, a third bed can be provided by the area of seats and demountable table, in the manner most common to folding camping trailers. Those skilled in the art will understand the applicability of accessory equipment without further description. I believe the largest market will be served without elaborate accessories, paneling, etc. As before mentioned, my camper can be sold quite substantially under the price of folding camping trailers because a chassis, tongue, axle and wheels are not required, which should make my camper a very economical way, for those having pickups, of accomodating four or more people in basic camping needs including beds and including other living areas not encumbered by the bed accomodations for four people, as beds are provided cantilevered out from the other living space.

The foregoing is a description of my discovery and perception of a new pickup camper that can be said to be partly a hybrid between a pickup camper cover or shell and a folding camping trailer, that is believed to appeal favorably to campers wanting accomodations in a certain modest price range. The appeal is especially to those wanting pickups for other purposes such as farmers, those already having pickups perhaps with camper shells, or those designing eventually to graduate into a cab-over camper, but not wanting or being able to purchase both pickup and cab-over camper at one time.

I claim:

1. The improvement in a camping body disposed in the bed of a standard pickup truck having a cab, said camping body having a flat, rigid roof and side and end upright walls, comprising:
   a. said roof being upwardly separable from the upper edges of said upright walls and there being roof elevation means at each corner of said body operative to raise said roof from a lower transportation position adjacent said upper edges to an upper camping position spaced above said upper edge a bed height, said roof in said lower transportation position being at a level less than a height above said cab sufficient to accomodate a bed and occupants and said roof in said upper camping position being at a level at least equal to a height above said cab sufficient to accommodate a bed and occupants,
   b. said camping body having two beds each wide enough to accommodate two people, and bed support means on said body supporting said beds for movement between an inner transportation position within the envelope defined by said body in said lower transportation position of said roof, and an outer camping position outwardly horizontally removed from said inner position and cantilevered horizontally out from front and rear end walls of said body, the forward bed in outer position extending over said cab,
   c. Flexible curtain means depending from said roof forming wall enclosures between said walls and said roof in said upper camping position of said roof, including sloping covers over said beds in said outer camping positions of said beds,
   d. said camping body in said lower transportation position of said roof being of standard camper shell height and said camping body in said upper camping position of said roof being of standard cab-over camper height, and
   e. said roof elevation means, beds, bed support means and curtain means being standard folding camping trailer parts.

2. The subject matter of claim 1 in which said one of said beds has foot means thereunder resting on said cab in said outer camping position thereof.

3. The subject matter of claim 1 in which one of said beds extends rearwardly and in which the rear end wall of said camping body has a door open to the upper edge of said rear wall, and in which the forward edge of said one of said beds is latched in an upper position relative to the position of the rear edge in the camping position of said beds, so that more head room is provided for access through said door when said one of said beds is not in use as a bed.

4. The improvement in a camping body disposed in the bed of a standard pickup truck having a cab, said camping body having a flat, rigid roof and side and end upright walls, comprising:
   a. said roof being upwardly separable from the upper edges of said upright walls and there being roof elevation means at each corner of said body operative to raise said roof from a lower transportation position adjacent said upper edges to an upper camping position spaced above said upper edge a bed height, said roof in said lower transportation position being at a level less than a height above said cab sufficient to accommodate a bed and occupants and said roof in said upper camping position being at a level at least equal to a height above said cab sufficient to accomodate a bed and occupants,
   b. said camping body having two beds each wide enough to accomodate two people, and bed support means on said body supporting said beds for movement between an inner transportation position within the envelope defined by said body in said lower transportation position of said roof, and an outer camping position outwardly horizontally removed from said inner position and cantilevered horizontally out from front and rear end walls of said body, the forward bed in outer position extending over said cab,
   c. flexible curtain means depending from said roof forming wall enclosures between said walls and said roof in said upper camping position of said roof, including sloping covers over said beds in said outer camping positions of said beds,
   d. One of said beds having foot means thereunder resting on said cab in said outer camping position thereof, and the other of said beds having foldable support means resting on said body, and
   e. said camping body in said lower transportation position of said roof being of standard camper shell height and said camping body in said upper camping position of said roof being of standard cab-over camper height.

* * * * *